(12) United States Patent
Kuwaoka

(10) Patent No.: US 6,697,688 B1
(45) Date of Patent: Feb. 24, 2004

(54) AUDIO INFORMATION PROCESSING SYSTEM

(75) Inventor: Toshiharu Kuwaoka, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 496 days.

(21) Appl. No.: 09/666,558

(22) Filed: Sep. 21, 2000

(30) Foreign Application Priority Data

Sep. 24, 1999 (JP) .......................................... P11-271267
Feb. 25, 2000 (JP) ....................................... P2000- 49935

(51) Int. Cl.⁷ .............................................. G06F 17/00
(52) U.S. Cl. ........................... 700/94; 341/143; 341/144
(58) Field of Search ............................... 341/61, 58–59, 341/68–69, 76, 144, 143; 700/94

(56) References Cited

U.S. PATENT DOCUMENTS 5,719,574 A * 2/1998 Nishio et al. ................ 341/143
6,449,519 B1 * 9/2002 Kuwaoka ..................... 700/94
2002/0188365 A1 * 12/2002 Kuwaoda ..................... 700/94

FOREIGN PATENT DOCUMENTS

| EP | 1187128 A2 | * 3/2002 | ........... G11B/20/10 |
| JP | 9-321631 | 12/1997 | |
| JP | 11126097 A | * 5/1999 | ............. G10L/9/14 |
| JP | 11-144382 | 5/1999 | |
| JP | 11144382 A | * 5/1999 | ........... G11B/20/10 |

* cited by examiner

Primary Examiner—Michael Tokar
Assistant Examiner—Khai M Nguyen
(74) Attorney, Agent, or Firm—Nath & Associates PLLC; Marvin C. Berkowitz

(57) ABSTRACT

A tone-quality improving portion applies a bit expansion process, an oversampling process, and a bandwidth expansion process to audio information that is decoded by a decoder, and then supplies resultant information to a D/A converter. Accordingly, the audio information can be played back in high tone quality without complicating a configuration of the D/A converter.

3 Claims, 15 Drawing Sheets

FIG. 4A
-90 dB,1kHz    bit up OFF
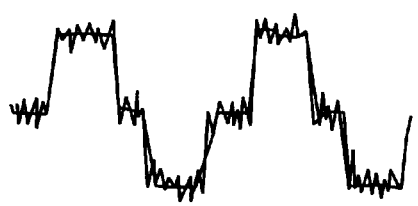
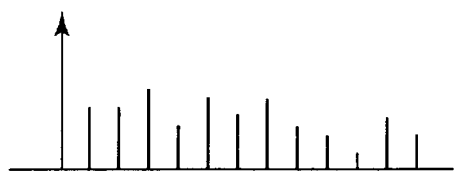
FIG. 4B
bit up ON
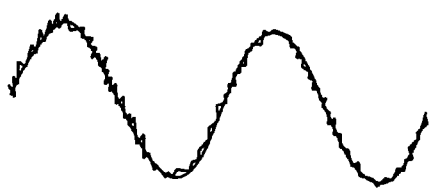
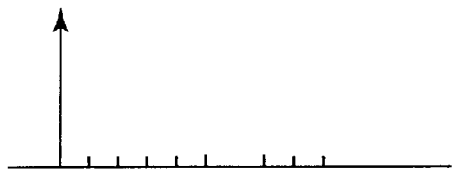

FIG. 11

| PATTERN | ADDITION/SUBTRACTION LEVEL |
|---|---|
| 2 fs ADDITION/ SUBTRACTION (2 bit) | 0,0:1/2 ADDITION/SUBTRACTION BY SETTING A DIFFERENCE LEVEL IN 2 fs TO 1/2<br>0,1:1/4 ADDITION/SUBTRACTION BY SETTING A DIFFERENCE LEVEL IN 2 fs TO 1/4<br>1,0:1/8 ADDITION/SUBTRACTION BY SETTING A DIFFERENCE LEVEL IN 2 fs TO 1/8<br>1,1:1/16 ADDITION/SUBTRACTION BY SETTING A DIFFERENCE LEVEL IN 2 fs TO 1/16 |
| 3 fs ADDITION/ SUBTRACTION (2 bit) | 0,0:1/2 ADDITION/SUBTRACTION BY SETTING A DIFFERENCE LEVEL IN 3 fs TO 1/2<br>0,1:1/4 ADDITION/SUBTRACTION BY SETTING A DIFFERENCE LEVEL IN 3 fs TO 1/4<br>1,0:1/8 ADDITION/SUBTRACTION BY SETTING A DIFFERENCE LEVEL IN 3 fs TO 1/8<br>1,1:1/16 ADDITION/SUBTRACTION BY SETTING A DIFFERENCE LEVEL IN 3 fs TO 1/16 |
| 4 fs ADDITION/ SUBTRACTION (2 bit) | 0,0:1/4 ADDITION/SUBTRACTION BY SETTING A DIFFERENCE LEVEL IN 4 fs TO 1/4<br>0,1:1/8 ADDITION/SUBTRACTION BY SETTING A DIFFERENCE LEVEL IN 4 fs TO 1/8<br>1,0:1/16 ADDITION/SUBTRACTION BY SETTING A DIFFERENCE LEVEL IN 4 fs TO 1/16<br>1,1:1/32 ADDITION/SUBTRACTION BY SETTING A DIFFERENCE LEVEL IN 4 fs TO 1/32 |
| 5 fs ADDITION/ SUBTRACTION (2 bit) | 0,0:1/4 ADDITION/SUBTRACTION BY SETTING A DIFFERENCE LEVEL IN 5 fs TO 1/4<br>0,1:1/8 ADDITION/SUBTRACTION BY SETTING A DIFFERENCE LEVEL IN 5 fs TO 1/8<br>1,0:1/16 ADDITION/SUBTRACTION BY SETTING A DIFFERENCE LEVEL IN 5 fs TO 1/16<br>1,1:1/32 ADDITION/SUBTRACTION BY SETTING A DIFFERENCE LEVEL IN 5 fs TO 1/32 |
| 6 fs ADDITION/ SUBTRACTION (2 bit) | 0,0:1/8 ADDITION/SUBTRACTION BY SETTING A DIFFERENCE LEVEL IN 6 fs TO 1/8<br>0,1:1/16 ADDITION/SUBTRACTION BY SETTING A DIFFERENCE LEVEL IN 6 fs TO 1/16<br>1,0:1/32 ADDITION/SUBTRACTION BY SETTING A DIFFERENCE LEVEL IN 6 fs TO 1/32<br>1,1:1/64 ADDITION/SUBTRACTION BY SETTING A DIFFERENCE LEVEL IN 6 fs TO 1/64 |
| 7 fs ADDITION/ SUBTRACTION (2 bit) | 0,0:1/8 ADDITION/SUBTRACTION BY SETTING A DIFFERENCE LEVEL IN 7 fs TO 1/8<br>0,1:1/16 ADDITION/SUBTRACTION BY SETTING A DIFFERENCE LEVEL IN 7 fs TO 1/16<br>1,0:1/32 ADDITION/SUBTRACTION BY SETTING A DIFFERENCE LEVEL IN 7 fs TO 1/32<br>1,1:1/64 ADDITION/SUBTRACTION BY SETTING A DIFFERENCE LEVEL IN 7 fs TO 1/64 |
| 8 fs ADDITION/ SUBTRACTION (2 bit) | 0,0:1/16 ADDITION/SUBTRACTION BY SETTING A DIFFERENCE LEVEL IN 8 fs TO 1/16<br>0,1:1/32 ADDITION/SUBTRACTION BY SETTING A DIFFERENCE LEVEL IN 8 fs TO 1/32<br>1,0:1/64 ADDITION/SUBTRACTION BY SETTING A DIFFERENCE LEVEL IN 8 fs TO 1/64<br>1,1:1/128 ADDITION/SUBTRACTION BY SETTING A DIFFERENCE LEVEL IN 8 fs TO 1/128 |

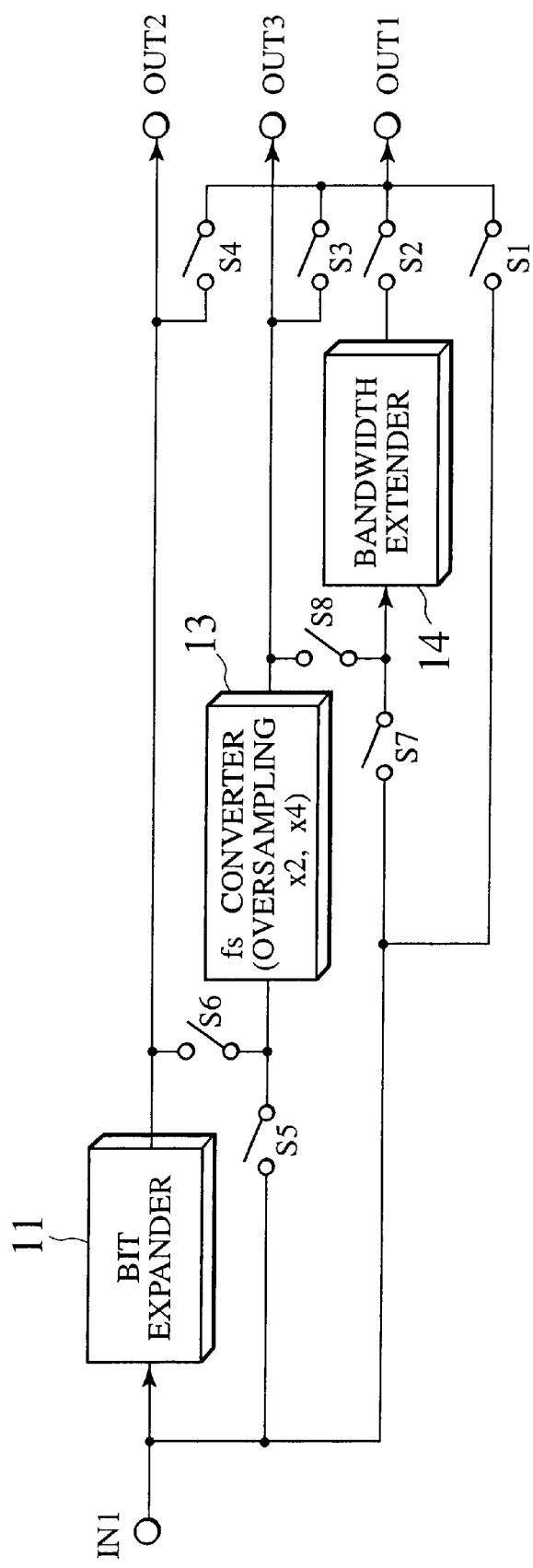

AUDIO INFORMATION PROCESSING SYSTEM

BACKGROUND OF THE INVENTION

1. Field of the Invention

The present invention relates to an audio information processing system suitable for devices such as the optical disc player, the mobile telephone, etc., that can deal with digital audio information.

2. Related Art

Conventionally, the optical disc player adapted to the so-called DVD(Digital Versatile Disc) format (referred to as a "DVD player" hereinafter) can play back not only the audio and the moving picture from the optical disc adapted to the DVD format but also the audio adapted to the CD(Compact Disc) format.

As shown in FIG. 1, for example, such DVD player system comprises a decoder 102 for decoding a digital signal read from an optical disc 101, and a D/A converter 103 for converting the digital signal decoded by the decoder 102 into an analog signal.

The digital signal to be input into the D/A converter 103 is different depending upon which format the optical disc 101 is adapted to the DVD formator the CD format. For example, if the digital audio information formatted by the CD format is supplied, the digital audio information whose sampling frequency of 44.1 kHz is supplied with 16-bit precision. In contrast, if the digital audio information formatted by the DVD format is supplied, the digital audio information which has higher tone quality than that formatted by the CD format and whose sampling frequency of 192 kHz (96 kHz) is supplied with 24-bit precision. For this reason, it is the existing circumstances that the D/A converter 103 has a complicated configuration rather than the normal case to play back the digital audio information formatted by different formats.

However, in the conventional DVD player system, the D/A converter 103 is constructed to conform with both formats such that the digital audio information formatted by both formats can be played back. In this case, in playing back the digital audio information formatted by the CD format, the digital audio information whose sampling frequency is 44.1 kHz is played back with 16-bit precision as it is. Therefore, there is such a problem that, although the D/A converter 103 has a high-level function to play back the digital audio information formatted by the DVD format, it merely plays back the digital audio information with low tone-quality. This problem becomes remarkable when the bit number and the sampling frequency of the original digital audio information are lowered.

SUMMARY OF THE INVENTION

The present invention has been made in view of the above drawbacks, and it is an object of the present invention to provide an audio information processing system capable of playing back digital audio information with high tone quality without complicating a configuration of a D/A converter.

In order to achieve the above object, there is provided an audio information processing system comprising: bit-number extending means for extending a bit number of supplied digital audio information; and digital audio information output terminal for outputting the digital audio information extended by the bit-number extending means.

According to the present invention, since the digital audio information whose bit number is extended by the bit-number extending means is output via the digital audio information output terminal, the audio information whose tone quality is improved by extending the bit number can be output digitally.

In the preferred embodiment of the present invention, the bit-number extending means extends the bit number into a predetermined bit number irrespective of the bit number of the supplied digital audio information.

Also, in order to achieve the above object, there is provided an audio information processing system comprising: resampling means for resampling supplied digital audio information at a sampling frequency higher than an original sampling frequency; and digital audio information output terminal for outputting the digital audio information which is subjected to resampling process by the resampling means.

According to the present invention, since the digital audio information which is resampled by the resampling means at the sampling frequency higher than the original sampling frequency is output via the digital audio information output terminal, the audio information whose tone quality is improved by the resampling process can be output digitally.

In the preferred embodiment of the present invention, the resampling means performs the resampling process at a predetermined sampling frequency irrespective of the sampling frequency of the supplied digital audio information.

Also, in order to achieve the above object, there is provided an audio information processing system comprising: bandwidth extending means for extending a frequency band of supplied digital audio information; and digital audio information output terminal for outputting the digital audio information which is extended by the bandwidth extending means.

According to the present invention, since the digital audio information whose frequency band is extended by the bandwidth extending means is output via the digital audio information output terminal, the audio information whose tone quality is improved by extending the frequency band can be output digitally.

Also, in order to achieve the above object, there is provided an audio information processing system comprising: bit-number extending means for extending a bit number of supplied digital audio information; resampling means for resampling the digital audio information, whose bit number is extended by the bit-number extending means, at a sampling frequency higher than an original sampling frequency; bandwidth extending means for extending a frequency band of the digital audio information which is subjected to resampling process by the resampling means; and digital audio information output terminal for outputting the digital audio information from bandwidth extending means.

According to the present invention, since the digital audio information whose bit number is extended by the bit-number extending means, which is resampled by the resampling means at the sampling frequency higher than the original sampling frequency, and whose frequency band is extended by the bandwidth extending means is output via the digital audio information output terminal, the audio information whose tone quality is improved by the bit expansion process, the resampling process, and the bandwidth extending process can be output digitally.

In the preferred embodiment of the present invention, the bit-number extending means extends the bit number into a predetermined bit number irrespective of the bit number of the supplied digital audio information, and the resampling means performs the resampling process at a predetermined sampling frequency irrespective of the sampling frequency of the supplied digital audio information.

In the preferred embodiment of the present invention, the audio information processing system further comprises controlling means for controlling the bit-number extending means, the resampling means, and the bandwidth extending means based on bit number information and sampling frequency information of the supplied digital audio information so as to execute any one of or any combination of a bit number extending process, a resampling process, and a frequency band extending process.

According to the preferred embodiment, the optimum process which is suitable for the bit number information and the sampling frequency of the supplied digital audio information can be performed by combining arbitrarily the bit number extending process, the resampling process, and the frequency band extending process.

Also, in order to achieve the above object, there is provided an audio information processing system comprising: bit-number extending means for extending a bit number of supplied digital audio information; and digital/analog converting means for converting the digital audio information from the bit-number extending means into analog information according to the bit number of the digital audio information which is extended by the bit-number extending means.

According to the present invention, since the digital audio information from the bit-number extending means is converted in the analog information by the digital/analog converting means according to the bit number of the audio information which is extended by the bit-number extending means and is output, the digital audio information can be played back in high tone quality.

In the preferred embodiment of the present invention; the bit-number extending means extends the bit number into a predetermined bit number irrespective of the bit number of the supplied digital audio information.

According to the preferred embodiment, the digital/analog converting means can be operated constantly irrespective of the supplied digital audio information, and thus the digital audio information can be reproduced in high tone quality without complicating a configuration of the digital/analog converting means.

Also, in order to achieve the above object, there is provided an audio information processing system comprising: resampling means for resampling supplied digital audio information at a sampling frequency higher than an original sampling frequency; and digital/analog converting means for converting the digital audio information from the resampling means into analog information according to the sampling frequency used in resampling process by the resampling means.

According to the present invention, since the digital audio information from the resampling means can be converted into the analog information by the digital/analog converting means according to the sampling frequency used in the resampling process by the resampling means, the digital audio information can be reproduced in high tone quality.

In the preferred embodiment of the present invention, the resampling means performs the resampling process at a predetermined sampling frequency irrespective of the sampling frequency of the supplied digital audio information.

According to the preferred embodiment, the digital/analog converting means can be operated constantly irrespective of the supplied digital audio information, and thus the digital audio information can be reproduced in high tone quality without complicating the configuration of the digital/analog converting means.

Also, in order to achieve the above object, there is provided an audio information processing system comprising: bandwidth extending means for extending a frequency band of supplied digital audio information; and digital/analog converting means for converting the digital audio information from the bandwidth extending means into analog information according to the frequency band of the digital audio information which is extended by the bandwidth extending means.

According to the present invention, since the digital audio information from the bandwidth extending means can be converted into the analog information by the digital/analog converting means according to the frequency band used of the audio information which is extended by the bandwidth extending means, the digital audio information can be reproduced in high tone quality.

Also, in order to achieve the above object, there is provided an audio information processing system comprising: bit-number extending means for extending a bit number of supplied digital audio information; resampling means for resampling the digital audio information, whose bit number is extended by the bit-number extending means, at a sampling frequency higher than an original sampling frequency; bandwidth extending means for extending a frequency band of the digital audio information which is subjected to resampling process by the resampling means; and digital/analog converting means for converting the digital audio information from the bandwidth extending means into analog information.

According to the present invention, since the digital audio information whose bit number is extended by the bit-number extending means, which is resampled by the resampling means at the sampling frequency higher than the original sampling frequency, and whose frequency band is extended by the bandwidth extending means is converted into the analog information by the digital/analog converting means to output, the digital audio information can be reproduced in high tone quality.

In the preferred embodiment of the present invention, the bit-number extending means extends the bit number into a predetermined bit number irrespective of the bit number of the supplied digital audio information, and the resampling means performs the resampling process at a predetermined sampling frequency irrespective of the sampling frequency of the supplied digital audio information.

According to the preferred embodiment, the digital/analog converting means can be operated constantly irrespective of the supplied digital audio information, and thus the digital audio information can be reproduced in high tone quality without complicating the configuration of the digital/analog converting means.

In the preferred embodiment of the present invention, the audio information processing system further comprises controlling means for controlling the bit-number extending means, the resampling means, and the frequency band extending means based on bit number information and sampling frequency information of the supplied digital audio information so as to execute any one of or any combination of a bit number extending process, a resampling process, and a frequency band extending process.

According to the preferred embodiment, the optimum process which is suitable for the bit number information and the sampling frequency of the supplied digital audio information can be performed by combining arbitrarily the bit number extending process, the resampling process, and the frequency band extending process.

The nature, principle and utility of the invention will become more apparent from the following detailed description when read in conjunction with the accompanying drawings.

BRIEF DESCRIPTION OF THE DRAWINGS

In the accompanying drawings:

FIGS. 4A and 4B are views showing a reproduced waveform in the tone-quality improving portion provided in the DVD player system according to the first embodiment respectively, wherein FIG. 4A shows the reproduced waveform to which bit extending process is not applied and FIG. 4B shows the reproduced waveform to which the bit extending process is applied;

FIG. 11 is a view showing an example of the addition/subtraction amount calculated every data pattern of the audio data;

FIG. 15 is block diagram showing a tone-quality improving portion provided in the DVD player system as a third embodiment, to which an audio information processing system according to the present invention is applied.

DESCRIPTION OF THE PREFERRED EMBODIMENTS

Embodiments of the present invention will be explained in detail with reference to the accompanying drawings hereinafter.

First Embodiment

Configuration of the First Embodiment

Figure 2:
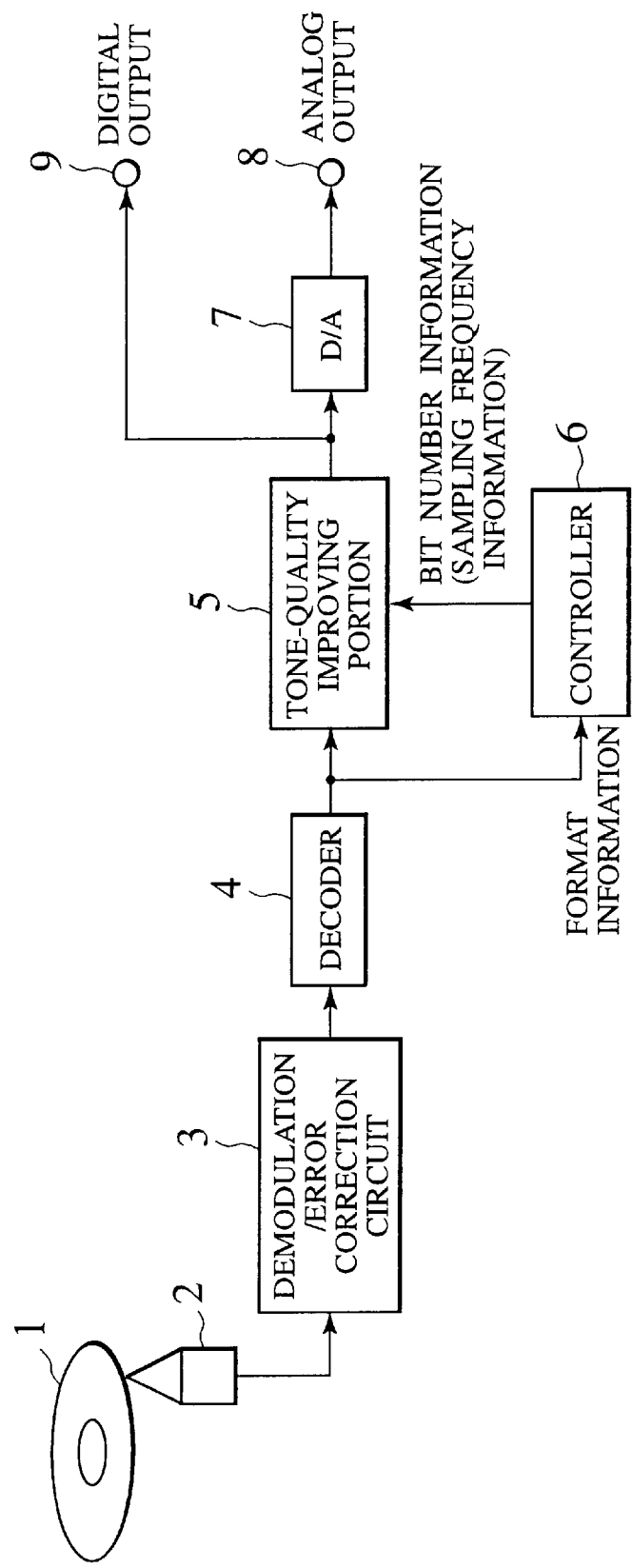
FIG. 2 is a block diagram showing a DVD player system as a first embodiment to which an audio information processing system according to the present invention is applied.

As shown in FIG. 2, for example, an audio information processing system according to the present invention can be applied to a DVD player system. The DVD player system as a first embodiment of the present invention comprises an optical pick-up 2 for reading digitally the audio data and the format data from an optical disc 1, a demodulation/error correction circuit 3 for performing the demodulating process and the error correcting process on the data supplied from the optical pick-up 2, and a decoder 4 for decoding the data on which the demodulating process and the error correcting process are performed by the demodulation/error correction circuit 3.

Also, this DVD player system comprises a tone-quality improving portion 5 for applying the tone-quality improving process, described later, to the audio data supplied from the decoder 4, a controller 6 for controlling the tone-quality improving process in the tone-quality improving portion 5 based on format data (bit number information, sampling frequency information, etc.) decoded by the decoder 4, a D/A converter 7 for converting the audio data, that are subjected to the tone-quality improving process by the tone-quality improving portion 5, into an analog signal, an analog output terminal 8 for outputting the audio signal supplied from the D/A converter 7 in analog fashion, and a digital output terminal 9 for outputting the audio signal which is subjected to the tone-quality improving process by the tone-quality improving portion 5 in digital fashion.

Such DVD player system can play back DVD (Digital Video Disc or Digital Versatile Disc: containing the recordable DVD in addition to the read-only DVD) and CD (Compact Disc), that is installed as the optical disc 1.

The audio data that are sampling-processed by the sampling frequency of 192 kHz and has 24-bit precision are recorded on the read-only DVD. Also, the audio data that are sampling-processed at the desired sampling frequency selected from 44.1 kHz, 48 kHz, 88.2 kHz, 96 kHz, 176.4 kHz, and 192 kHz, for example, are recorded on the recordable DVD (DVD-R, DVD-RW: DVD-write once, DVD-rewritable) with desired bit-number precision selected from 16-bit, 20-bit, and 24-bit, for example. Also, the 16-bit audio data that are sampling-processed at the sampling frequency of 44.1 kHz are recorded on the CD.

The DVD player system of the first embodiment can play back both the DVD and the CD. In addition to the above, the DVD player system can recognize the CD automatically when the CD is installed therein, and then can improve the tone quality of the audio data on the CD to be equivalent to that of the audio data recorded on the DVD and then play back such audio data.

Operation of the First Embodiment

Next, an operation of the DVD player system having such configuration according to the first embodiment will be explained hereunder. When the optical disc 1 is installed into the DVD player system, the optical pick-up 2 reproduces the format information and the audio data recorded on the optical disc 1 and supplies them to the demodulation/error correction circuit 3. The demodulation/error correction circuit 3 executes the demodulating process of the format information and the audio data and also applies the error correcting process to them, and then supplies them to the decoder 4. The decoder 4 decodes the format information and the audio data supplied from the demodulation/error correction circuit 3, and then supplied the decoded format information to the controller 6 and also supplies the decoded audio data to the tone-quality improving portion 5.

Figure 3:
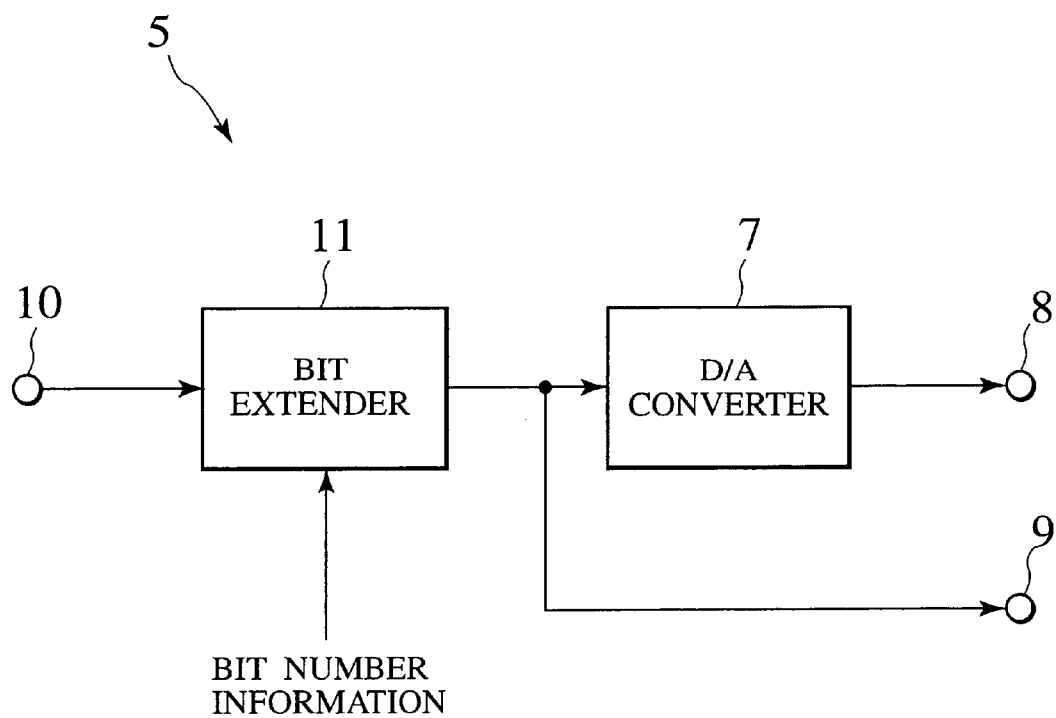
FIG. 3 is a block diagram showing a tone-quality improving portion provided to the DVD player system according to the first embodiment.

The controller 6 detects the bit-number information of the audio data recorded on the optical disc 1 from the format information supplied from the decoder 4, and then supplies this bit-number information to the tone-quality improving portion 5. As shown in FIG. 3, the tone-quality improving portion 5 is composed of a bit extender 11. The audio data is supplied from the decoder 4 via the input terminal 10, and also the format information is supplied from the controller 6.

When the audio data reproduced from the optical disc 1 is below 24 bits such as 16 bits, for example, the bit extender 11 performs the bit extending process to convert into the uniform 24-bit audio data, that are identical to those on the DVD, with the use of the bit extending technology disclosed previously in Patent Application Publication (KOKAI) Hei 9-321631 or Patent Application Publication (KOKAI) Hei 9-321632 by the applicant of this application.

The DVD player system has the digital output terminal 9 for outputting the digital signal and the analog output terminal 8 for outputting the analog signal. The bit extender 11 supplies the audio data, to which the bit extending process into the 24 bit is applied, to the digital output terminal 9 and the analog output terminal 8 respectively.

Accordingly, the audio data whose tone-quality is improved into 24 bit by the bit extending process can be output in digital fashion via the digital output terminal 9. The audio data are supplied to a digital equipment such as a digital video tape recorder system, a digital audio player system, etc., for example, and then recorded and played back thereby in digital fashion. As a result, such digital system can record and play back the audio data that have the high tone-quality (24 bit) rather than the original audio data (16 bit), without deterioration of the tone-quality.

Meanwhile, the D/A converter 7 converts the audio data, that are subjected to the bit extending process into 24 bit, into the analog signal and outputs this data via the analog output terminal 8.

FIG. 4A shows the audio signal that is generated by converting the 16-bit audio data into the analog data by the D/A converter 7, and FIG. 4B shows the audio signal that is generated by converting the 24-bit audio data into the analog data by the D/A converter 7. In the event that the audio data is 16-bit, even if the data are converted into the analog data by the high performance D/A converter 7 adapted to the DVD format, the resolution is degraded because the bit number is small. Thus, the smooth original waveform is reproduced as the stepwise waveform.

However, like the DVD player system according to the first embodiment, since the 16-bit audio information is bit-extended into the 24-bit audio information, for example, by the bit extender 11 and then converted into the analog information by the D/A converter 7, the resolution can be improved by increasing the bit number. Thus, the original smooth analog waveform can be reproduced substantially as it is, and thus the tone-quality of the audio information can be improved.

Advantages of the First Embodiment

As apparent from the above explanation, in the DVD player system according to the first embodiment, the audio data of less than 24-bit precision is bit-extended uniformly into the audio data with 24-bit precision by the bit extender 11, and then this data can be output in digital fashion via the digital output terminal 9. Therefore, the DVD player system according to the first embodiment makes it possible to deal with the audio data whose tone quality is improved in digital fashion.

Also, since the audio data that are bit-extended into the audio data with 24-bit precision are converted in the analog data by the D/A converter 7 and then output via the analog output terminal 8, the original smooth analog waveform can be reproduced by the bit extending process substantially as they are, and therefore the improvement of the tone quality can be achieved.

In addition, since the bit extender 11 applies the bit extending process "uniformly" to change the audio data of less than 24-bit precision to the audio data with 24-bit precision, not only one type D/A converter, i.e., the existing D/A converter adapted to the DVD format, can be employed as the D/A converter 7 as it is, but also the D/A converter 7 can be operated at a predetermined frequency.

Therefore, because the D/A converter 7 does not need to be provided with functions adapted to a plurality of formats such as the CD format, the DVD format, etc., the D/A converter 7 can be simplified in structure and thus reduction in cost of the DVD player system can be achieved.

Furthermore, in the explanation of the first embodiment, if the audio data recorded on the optical disc 1 are less than 24-bit precision, the bit extending process is applied uniformly to the audio data with 24-bit precision. However, if the bit number is larger than that of the original audio information, any bit extending process into other bit number, e.g., the bit extending process of the audio data with 20-bit precision or the bit extending process of the audio data with more than 20-bit precision, etc. may be applied.

Second Embodiment

Next, a DVD player system according to a second embodiment of the present invention will be explained hereunder. Although the DVD player system according to the above first embodiment achieves the improvement of the tone-quality by applying the bit extending process to the audio data supplied from the CD by the bit extender 11, the DVD player system according to the second embodiment can achieve improvement of the tone-quality by applying an oversampling process (resampling process) to the audio data reproduced from the CD at the sampling frequency higher than the original sampling frequency and then by applying a bandwidth extending process to the audio data which are subjected to the oversampling process.

The second embodiment is different from the above first embodiment in this respect. Hence, merely this difference will be explained hereunder and thus its redundant explanation will be omitted.

Configuration of the Second Embodiment

Figure 5:
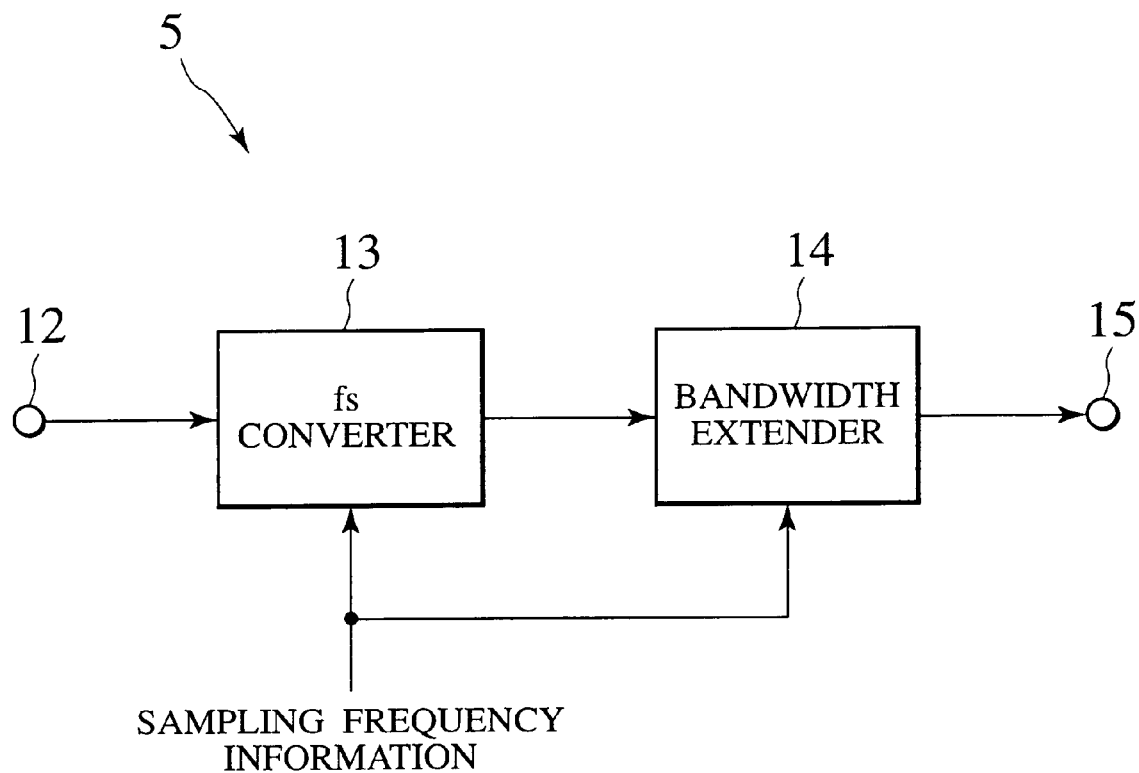
FIG. 5 is a block diagram showing a tone-quality improving portion provided to the DVD player system as a second embodiment to which an audio information processing system according to the present invention is applied.

The DVD player system according to the second embodiment has a frequency converter (fs converter) 13 and a bandwidth extender 14 shown in FIG. 5 as the tone-quality improving portion 5 shown in FIG. 2.

Figure 6:
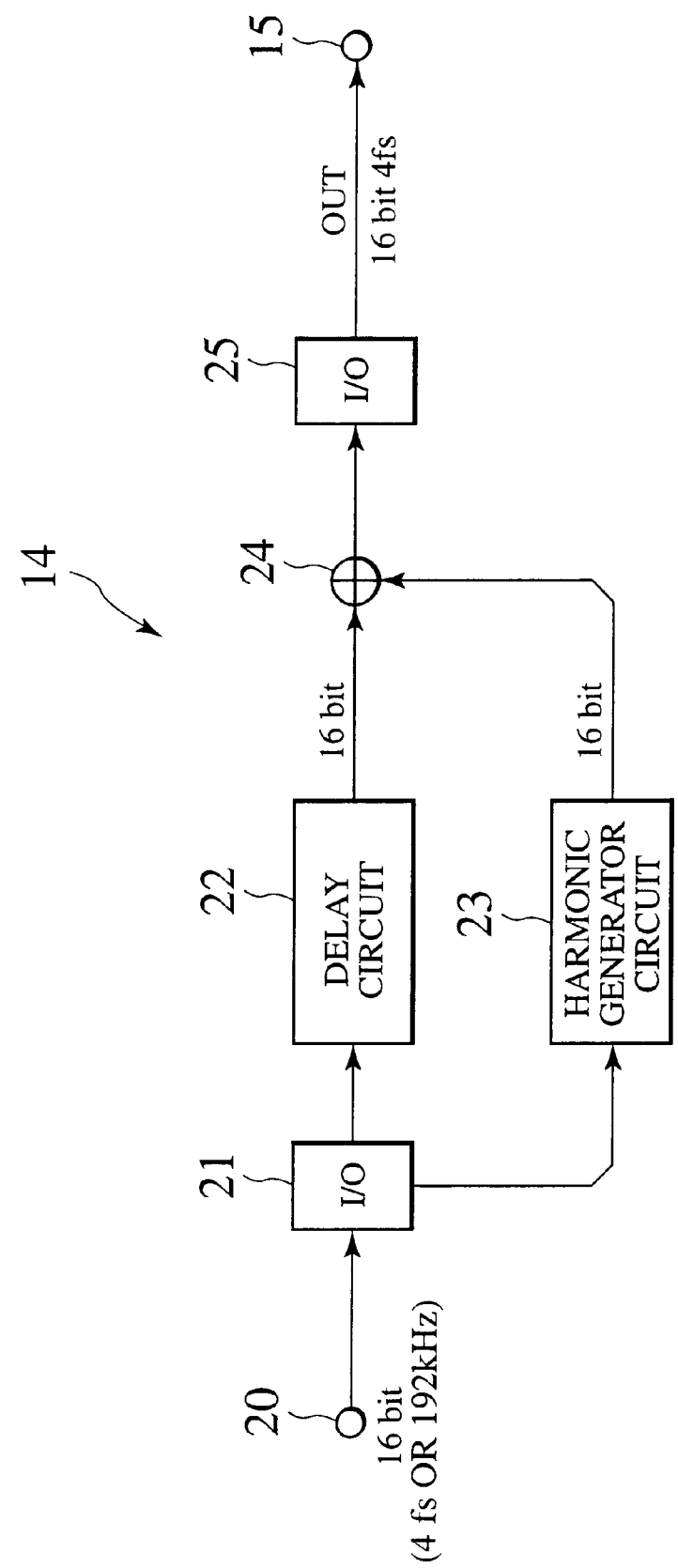
FIG. 6 is a block diagram showing a bandwidth extender provided to the DVD player system of the second embodiment.

As shown in FIG. 6, the bandwidth extender 14 comprises an I/O port 21 for receiving the 16-bit audio information that is oversampling-processed by the frequency converter 13 at the sampling frequency of 4 fs (176.4 kHz) or 192 kHz, for example, a harmonic generator circuit 23 for generating harmonic data based on this 16-bit audio information, a delay circuit 22 for delaying the audio data supplied via the I/O port 21 by a time required for the harmonic generating process in the harmonic generator circuit 23, an adder 24 for adding the harmonic data from the harmonic generator circuit 23 to the audio data from the delay circuit 22 to generate the audio data whose frequency band is extended, and an I/O port 25 for outputting the audio data supplied from the adder 24.

Figure 7:
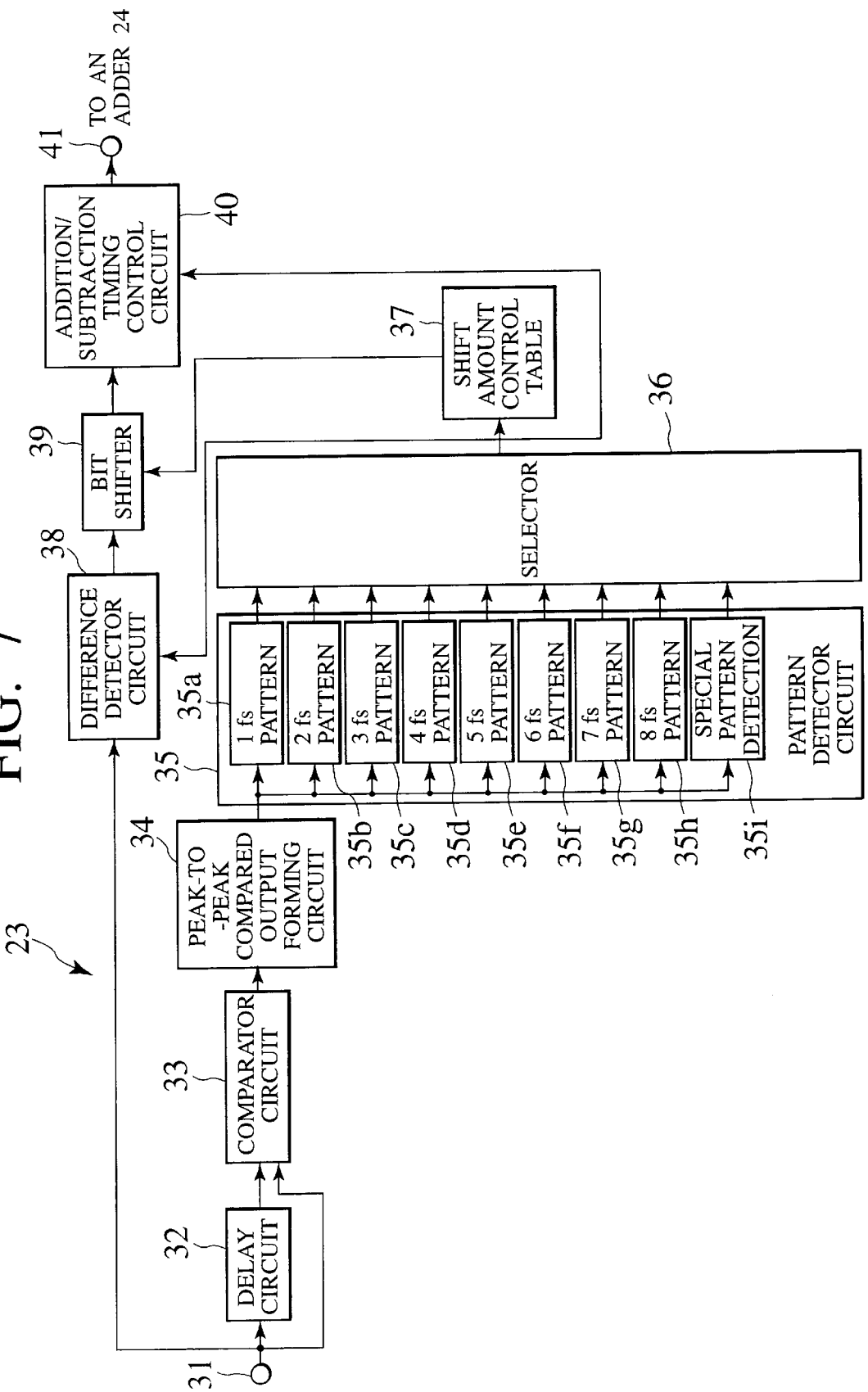
FIG. 7 is a block diagram showing a harmonic generator circuit provided to the bandwidth extender.

The harmonic generator circuit 23 has a configuration shown in FIG. 7. The harmonic generator circuit 23 comprises an input terminal 31 to which the 16-bit audio data received via the I/O port 21 is supplied, a delay circuit 32 for delaying the audio data by one sample, a comparator circuit 33 for comparing a level of the present audio data supplied via the input terminal 31 with a level of the audio data delayed by one sample, and a peak-to-peak compared output forming circuit 34 for detecting a top peak level and an under peak level of the waveform of the audio data based on a compared output from the comparator circuit 33 and then outputting a compared output from the top peak to the under peak and a compared output from the under peak to the top peak.

Also, the harmonic generator circuit 23 comprises a pattern detector circuit 35 for detecting to which pattern among a plurality of previously stored data patterns the compared output from the peak-to-peak compared output forming circuit 34 corresponds, a selector 36 for selecting respective pattern detection outputs supplied from the pattern detector circuit 35, and a shift amount control table 37 in which addition/subtraction amounts used to form the harmonics are stored to correspond to the pattern detected outputs from the selector 36.

In addition, the harmonic generator circuit 23 comprises a difference detector circuit 38 for detecting a difference between sample values corresponding to the pattern detection outputs from the selector 36 based on the audio data supplied via the input terminal 31, a bit shifter 39 for forming addition/subtraction data by applying the bit shifting process corresponding to the addition/subtraction amounts from the shift amount control table 37 to the difference data supplied from the difference detector circuit 38, and an addition/subtraction timing control circuit 40 for outputting the addition/subtraction data from the bit shifter 36 via an output terminal 41 at a timing corresponding to respective pattern detection outputs from the selector 36.

Although discussed in detail in the following, the DVD player system according to the second embodiment adds the harmonic component to the original 16-bit audio data and outputs the resultant, by supplying the addition/subtraction data from the addition/subtraction timing control circuit 40 to the adder 24 shown in FIG. 6 to be added to the original 16-bit audio data from the delay circuit 22.

Operation of the Second Embodiment

In the DVD player system according to the second embodiment, the 16-bit audio data decoded by the decoder 4 shown in FIG. 2 is supplied to the frequency converter 13 via the input terminal 12 shown in FIG. 5.

In the case of the DVD player system according to the second embodiment, the controller 6 detects the sampling frequency based on the format information from the decoder 4 and then supplies this sampling frequency information to the frequency converter 13 and the bandwidth extender 14.

The frequency converter 13 detects the sampling frequency of the currently supplied audio data based on the sampling frequency information, then applies uniformly the oversampling process to the audio data by using a sampling pulse of the sampling frequency of 4 fs or 192 kHz if the original sampling frequency (fs:fs=44.1 kHz) is less than a quadruple frequency (4 fs=176.4 kHz) or less than the sampling frequency of 192 kHz which is the sampling frequency of the uppermost format in the DVD audio format, and then supplies this to the bandwidth extender 14.

Figure 8:
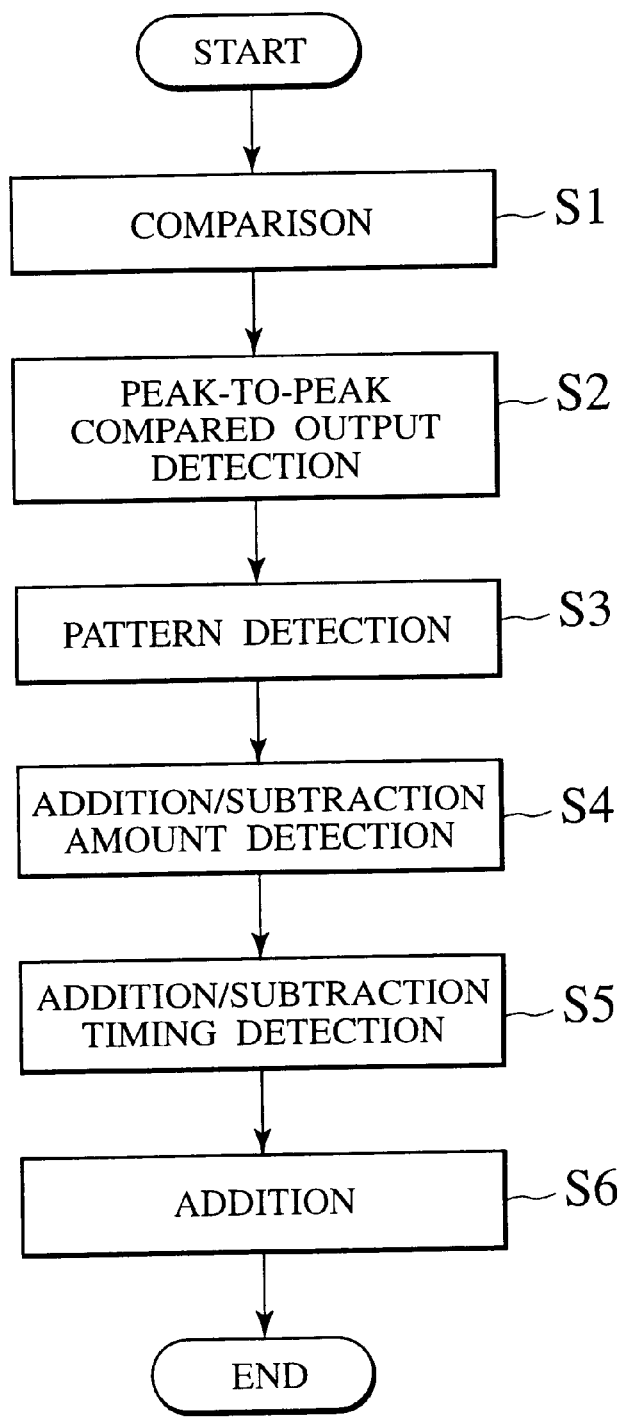
FIG. 8 is a flowchart showing a bandwidth extending operation of the DVD player system of the second embodiment.

A series of operations in the bandwidth extender 14 for forming the audio data to which the harmonics are added are given in a flowchart shown in FIG. 8. This flowchart is started by supplying the 16-bit audio data, which is converted into the sampling frequency of 4 fs (176.4 kHz) or 192 kHz by the frequency converter 13, to the bandwidth extender 14, and the process goes to step S1.

The audio data supplied to the bandwidth extender 14 is supplied to the delay circuit 22 and the harmonic generator circuit 23 via the input terminal 20 and the I/O port 21 shown in FIG. 6 respectively. The delay circuit 22 applies the delaying process of the data processing time required for the harmonic generator circuit 23, described in the following, to the supplied audio data and then supplies this to the adder 24.

The audio data supplied to the harmonic generator circuit 23 is directly supplied to the comparator circuit 33 via the input terminal 31 shown in FIG. 7, and also the audio data which is delayed by one sample by the delay circuit 32 is supplied to the comparator circuit 33. In step S1, the comparator circuit 33 compares the present audio data with the audio data to which the one-sample delay is applied by the delay circuit 32, and then supplies the compared output to the peak-to-peak compared output forming circuit 34. Then, the process goes to step S2.

In other words, in above step S1, the supplied audio data is compared with the audio data in the preceding sample every sample. Then, the comparator circuit 33 supplies "0" to the peak-to-peak compared output forming circuit 34 if the sample value of the present audio data is larger than that of the audio data in the preceding sample, and it supplies "1" to the peak-to-peak compared output forming circuit 34 if the sample value of the present audio data is smaller than that of the audio data in the preceding sample.

In this comparison, there is the case where the present audio data and the audio data in the preceding sample have the same sample value. In this case, the comparator circuit 33 compares the present audio data with the audio data two samples before. If they also have the same value, then the comparator circuit 33 compares the present audio data with the audio data three samples before. In this way, the comparator circuit 33 compares the present audio data with the last sample values in sequence retroactively.

Also, if the audio data having the same sample value continues nine samples or more, this means a blank. Hence, the comparator circuit 33 continues the comparison. Then, when change of the audio data occurs, the comparator circuit 33 outputs "0" as the compared output if the audio data of the sample at the time of the change is larger than the present audio data, and outputs "1" as the compared output if the audio data of the sample at the time of the change is smaller than the present audio data.

Then, in step S2, the peak-to-peak compared output forming circuit 34 detects the top peaks and the under peaks based on the compared output from the comparator circuit 33 respectively, then detects the compared output from the top peak to the under peak and the compared output from the under peak to the top peak, and then supplies them to the pattern detector circuit 35. Then, the process goes to step S3.

Figure 9A:
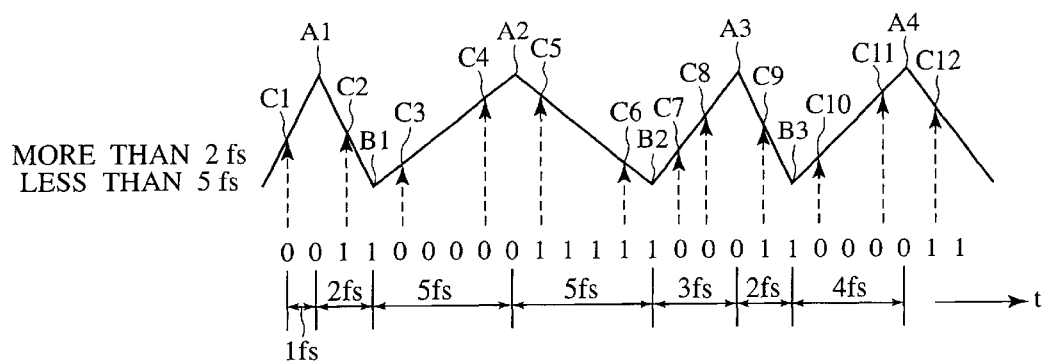
FIGS. 9A to 9C are views showing timings for adding/subtracting a predetermined addition/subtraction amount every data pattern of the audio data upon extending a frequency band respectively, in the DVD player system of the second embodiment.

More particularly, when the comparator circuit 33 performs the above comparison, the compared output of "0" or "1" for the waveform of the audio data, as shown in FIG. 9A, for example, can be obtained. The outputs "0", "1" shown in FIG. 9A are aligned at a one sample interval respectively. As can be seen from FIG. 9A, the audio data corresponding to the compared output "0", that is the preceding sample of the compared output "1" in at the time point when the compared output "0" changes into the compared output "1", indicates the "top peak". Similarly, as can be seen from FIG. 9A, the audio data corresponding to the compared output "1", that is the preceding sample of the compared output "0" at the time point when the compared output "1" changes into the compared output "0", indicates the "under peak".

Therefore, the peak-to-peak compared output forming circuit 34 detects the top peaks A1, A2, A3 . . . and the under peaks B1, B2, B3 . . . , as shown in FIG. 9A, based on change of the compared output. Then, the peak-to-peak compared output forming circuit 34 supplies the compared outputs between successive top peak and under peak as the peak-to-peak compared output to the pattern detector circuit 35.

In other words, since the compared output between successive top peak and under peak, for example, between the top peak A1 and the under peak B1 is "1,1", the peak-to-peak compared output forming circuit 34 supplies the compared output "1,1" as the peak-to-peak compared output to the pattern detector circuit 35. Since the compared output between the under peak B1 and the top peak A2 is "0,0,0,0,0" the peak-to-peak compared output forming circuit 34 supplies the compared output "0,0,0,0,0" as the peak-to-peak compared output to the pattern detector circuit 35.

Then, after such peak-to-peak compared output is supplied to the pattern detector circuit 35, the process goes to step S3. In the DVD player system of the second embodiment, the peak-to-peak compared output is compared with patterns stored in the pattern detector circuit 35, and thus it is decided to which pattern among previously stored patterns this peak-to-peak compared output corresponds.

In other words, successive patterns of the same peak-to-peak compared outputs appearing between successive top peak and under peak are previously stored in the pattern detector circuit 35. More specifically, "1 fs pattern" indicating that continuity of the same peak-to-peak compared output between the top peak and the under peak corresponds to only one sample of "1" or "0"; "2 fs pattern" indicating that the continuity corresponds to two samples of "1,1" or "0,0"; "3 fs pattern" indicating that the continuity corresponds to three samples of "1,1,1" or "0,0,0"; "4 fs pattern" indicating that the continuity corresponds to four samples of "1,1,1,1" or "0,0,0,0"; "5 fs pattern" indicating that the continuity corresponds to five samples of "1,1,1,1,1" or "0,0,0,0,0"; "6 fs pattern" indicating that the continuity corresponds to six samples of "1,1,1,1,1,1" or "0,0,0,0,0,0,0"; "7 fs pattern" indicating that the continuity corresponds to seven samples of "1,1,1,1,1,1,1" or "0,0,0,0,0,0,0"; "8 fs pattern" indicating that the continuity corresponds to eight samples of "1,1,1,1,1,1,1,1" or "0,0,0,0,0,0,0,0"; and "special pattern" indicating that the continuity corresponds to more than nine samples of "0's" or "1's" are stored in respective memories 35a to 35i of the pattern detector circuit 35. The pattern detector circuit 35 compares the peak-to-peak compared outputs with respective patterns stored in the memories 35a to 35i in parallel and supplies respective compared outputs to the selector 36.

The selector 36 selects the compared output indicating that the peak-to-peak compared output coincides with the pattern out of the compared outputs supplied from the pattern detector circuit 35, and then supplies this compared output to the shift amount control table 37, the difference detector circuit 38, and the addition/subtraction timing control circuit 40 respectively.

Then, after the compared output is supplied from the selector 36 to the shift amount control table 37, the difference detector circuit 38, and the addition/subtraction timing control circuit 40, the DVD player system of the second embodiment proceeds to step S4 wherein the addition/subtraction amount used to generate the harmonics is detected.

Specifically, in the DVD player system of the second embodiment, since the level corresponding to the compared output from the selector 36 is added/subtracted to/from the predetermined sample value of the 16-bit audio data (original audio data) supplied from the delay circuit 22 shown in FIG. 6, a frequency band of the original audio data can be extended.

More particularly, if the pattern of the peak-to-peak compared output between the top peak and the under peak is more than 2 fs pattern and less than 5 fs pattern, the data having a level corresponding to the differences between the top peak and the preceding and succeeding sample values is "added" to "the preceding and succeeding sample values C1, C2, C4, C5, C8, C9, C10, C11 . . . " of the sample values of the top peaks A1, A2, A3 . . . , otherwise the data having a level corresponding to the differences between the under peak and the preceding and succeeding sample values is "subtracted" from "the preceding and succeeding sample values C2, C3, C6, C7, C9, C10, . . . " of the sample values of the under peaks B1, B2, B3 . . . , as shown in FIG. 9A. (The predetermined value is added to the preceding and succeeding sample values of the top peak, and the predetermined value is subtracted from the preceding and succeeding sample values of the under peak.)

Figure 9B:
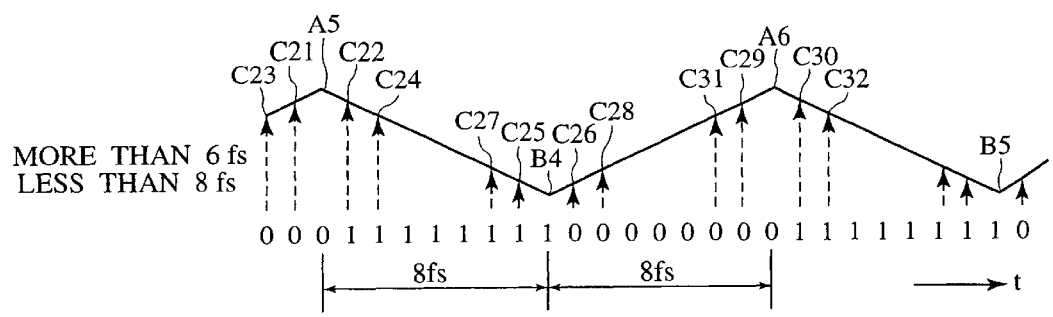

Also, if the pattern of the peak-to-peak compared output between the top peak and the under peak is more than 6 fs pattern and less than 8 fs pattern, the data having a level corresponding to the differences between the top peak and the preceding and succeeding sample values is "added" to "the preceding and succeeding sample values C21, C22, C29, C30 . . . " of the sample values of the top peaks A5, A6 . . . , and also the data having a level corresponding to the differences between the preceding and succeeding sample values of the top peak and sample values two samples before and after from the top peak is "added" to "the sample values two samples before and after, C23, C24, C31, C32 . . . " from the sample values of the top peaks A5, A6 . . . , as shown in FIG. 9B. (The predetermined value is added to the preceding and succeeding sample values of the top peak and the sample values two samples before and after from the top peak.)

Figure 9C:
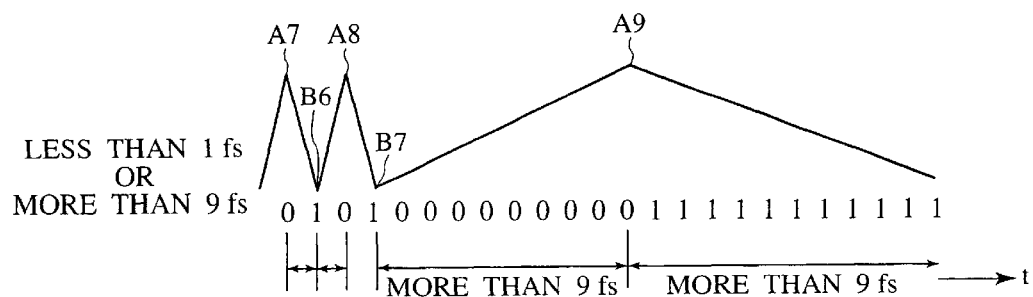

In addition, if the pattern of the peak-to-peak compared output between the top peak and the under peak is more than 6 fs pattern and less than 8 fs pattern, the data having a level corresponding to the differences between the under peak and the preceding and succeeding sample values is "subtracted" from "the preceding and succeeding sample values C25, C26 . . . " of the sample values of the under peaks B4, B5, . . . and also the data having a level corresponding to the differences between the preceding and succeeding sample values of the top peak and sample values two samples before and after is "subtracted" from "the sample values two samples before and after, C27, C28 . . . " from the sample values of the under peaks B4, B5 . . . , as shown in FIG. 9B. (The predetermined value is subtracted from the preceding and succeeding sample values of the under peak and the sample values two samples before and after from the under peak.) Further, as described above, since respective sample values are sampled by using the sampling frequency of 96 kHz, the sample values indicate the sufficiently high harmonics if the pattern of the peak-to-peak compared output is the 1 fs pattern, like the patterns of the peak-to-peak compared outputs between the top peak A7 and the under peak B6 and the top peak A8 and the under peak B7, as shown in FIG. 9C. Therefore, in this case, the above mentioned adding/subtracting process is not applied.

Similarly, if the pattern of the peak-to-peak compared output between the top peak and the under peak is more than 9 fs pattern, like the patterns of the peak-to-peak compared outputs between the under peak B7 and the top peak A7 and after the top peak A9, as shown in FIG. 9C, the sample values indicate the blank, etc. In this case, the foregoing adding/subtracting process is not applied.

An addition/subtraction amount to be added/subtracted to/from these sample values is detected as described in the following. As mentioned above, when the compared output is supplied from the selector 36 to the difference detector circuit 38 shown in FIG. 7, the difference detector circuit 38 detects the difference between the sample values that correspond to respective patterns indicated by the supplied compared output.

Figure 1:
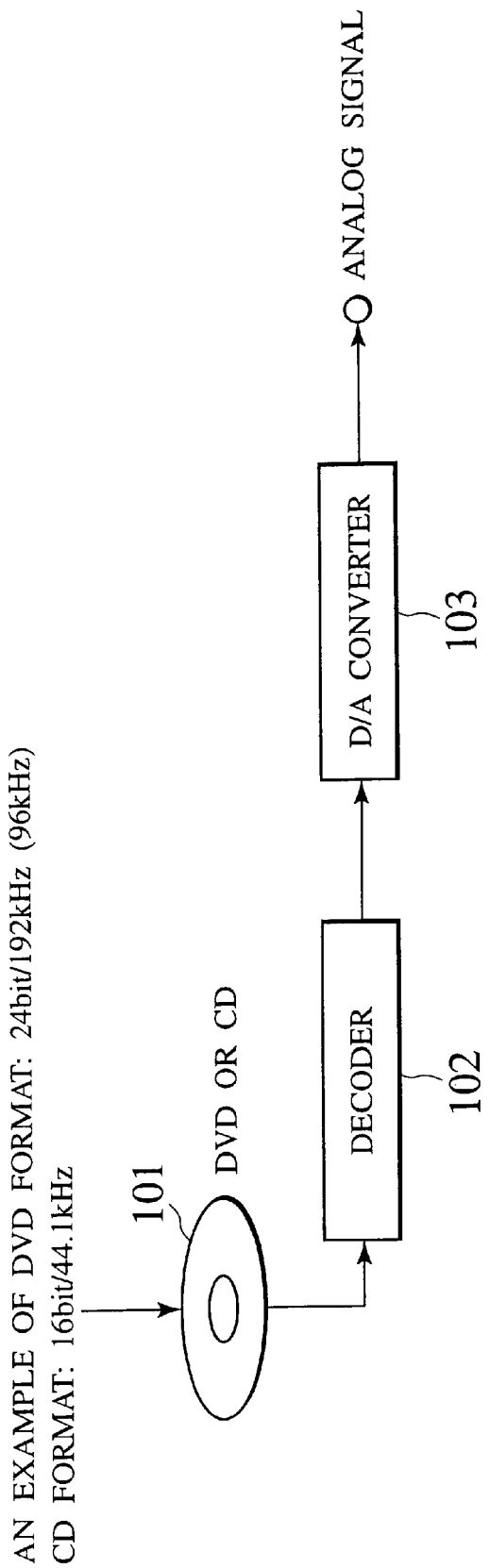
FIG. 1 is a block diagram showing a schematic configuration of a conventional DVD player system.
Figure 10A:
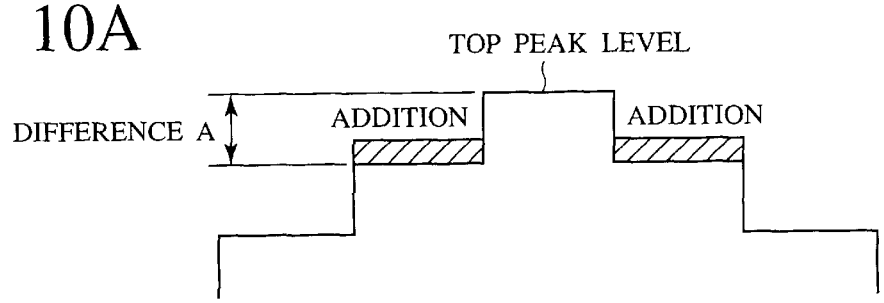
FIGS. 10A to 10D are views showing how to calculate the addition/subtraction amount respectively.
Figure 10B:
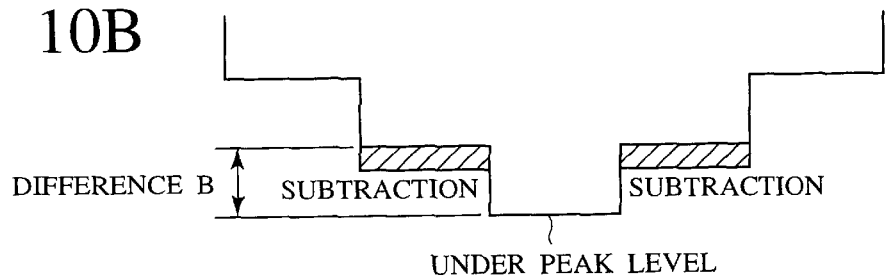
Figure 10C:
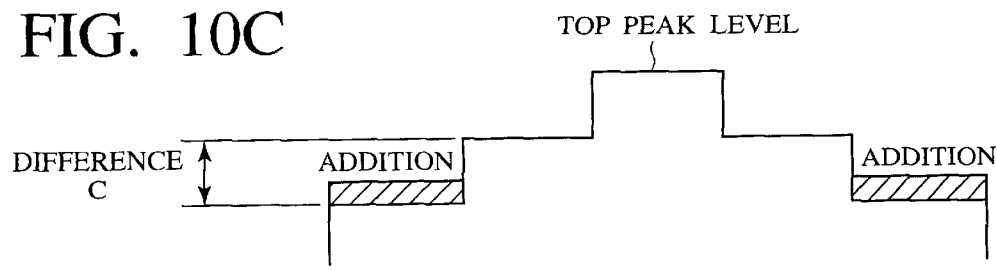
Figure 10D:
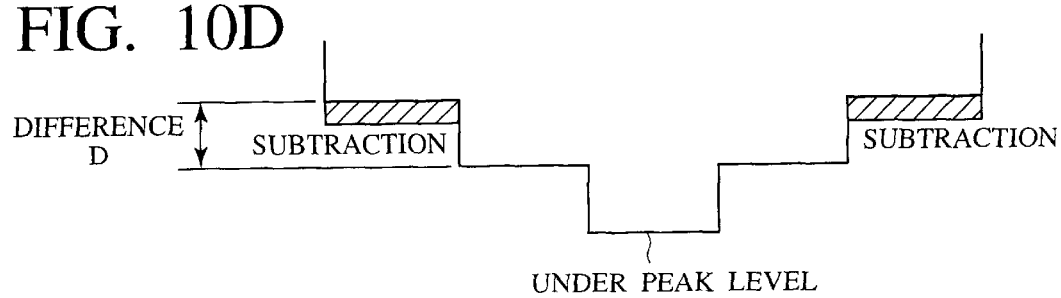

In other words, if the supplied compared output indicates the pattern of "more than 2 fs pattern and less than 5 fs pattern", the difference detector circuit 38 detects the difference A between the sample value of the top peak and the preceding and succeeding sample values of the top peak, as shown in FIG. 1A, or the difference B between the sample value of the under peak and the preceding and succeeding sample values of the under peak, as shown in FIG. 10B, and then supplies this to the bit shifter 39. If the supplied compared output indicates the pattern of ∫more than 6 fs pattern and less than 8 fs pattern", the difference detector circuit 38 detects the difference C between the preceding and succeeding sample values of the top peak and sample values two samples before and after from the top peak, as shown in FIG. 10C, or the difference D between the preceding and succeeding sample values of the under peak and sample values two samples before and after from the under peak, as shown in FIG. 10D, and then supplies this to the bit shifter 39.

In this case, if the pattern of the peak-to-peak compared output is the special pattern of 1 fs pattern, 9 fs pattern or more, such pattern corresponds to the pattern to which the adding/subtracting process is not applied, as described by using FIG. 9C, and thus the difference detector circuit 38 does not perform the detection of the difference level.

Meanwhile, in order to convert difference levels A to D being supplied to the bit shifter 39 into the addition/subtraction amounts corresponding to respective 2 fs to 8 fs patterns, shift amounts for the difference levels A to D in the bit shifter 39, that are classified into four stages according to the difference levels A to D, for example, are stored previously in the shift amount control table 37.

More particularly, as shown in FIG. 11, respective shift amounts used to generate the addition/subtraction amount by setting the difference level A or the difference level B to ½ to ⅟₁₆ levels based on their levels when the pattern of the peak-to-peak compared output is the 2 fs pattern or the 3 fs pattern are stored in the shift amount control table 37.

Also, respective shift amounts used to generate the addition/subtraction amount by setting the difference level A or the difference level B to ¼ to ⅟₃₂ levels based on their levels when the pattern of the peak-to-peak compared output is the 4 fs pattern or the 5 fs pattern are stored in the shift amount control table 37. Also, respective shift amounts used to generate the addition/subtraction amount by setting the difference levels A to D to ⅛ to ⅟₆₄ levels based on their levels when the pattern of the peak-to-peak compared output is the 6 fs pattern or the 7 fs pattern are stored in the shift amount control table 37.

In addition, respective shift amounts used to generate the addition/subtraction amount by setting the difference levels A to D to ⅟₁₆ to ⅟₁₂₈ levels based on their levels when the pattern of the peak-to-peak compared output is the 8 fs pattern are stored in the shift amount control table 37.

The addition/subtraction amounts corresponding to respective shift amounts were found by the inventors of this application based on the human engineering by repeating the listening over a long term of years. Accordingly, as described later, it is feasible to obtain the sound output of high tone-quality by adding/subtracting the addition/subtraction amounts to the original audio data.

The shift amount control table 37 detects the pattern of the peak-to-peak compared output based on the compared output supplied from the selector 36 and then detects the above shift amount (FIG. 11) corresponding to this pattern. Then, the shift amount control table 37 supplies the shift data indicating this shift amount to the bit shifter 39 to which the difference levels A to D are supplied.

The bit shifter 39 sets the difference levels A to D into ½ to ⅟₁₂₈ levels according to the pattern of the peak-to-peak compared output by applying the bit shifting process to the difference levels A to D supplied from the difference detector circuit 38 based on the shift data supplied from the shift amount control table 37, and then supplies them to the addition/subtraction timing control circuit 40 as the addition/subtraction amounts (addition/subtraction data).

As mentioned above, the addition/subtraction data is added to the preceding and succeeding sample values of the top peak or the sample values two samples before and after from the top peak, while the addition/subtraction data is subtracted from the preceding and succeeding sample values of the under peak or the sample values two samples before and after from the under peak. In this case, the adding process or the subtracting process is designated in such a way that the bit shifter 39 sets the most significant bit (MSB) of the addition/subtraction data, that acts as the sign bit, to "1 (addition)" or "0 (subtraction)".

Then, after the addition/subtraction data are formed, the DVD player system of the second embodiment proceeds to step S5. Thus, output timings of the formed addition/subtraction data are controlled.

In other words, as mentioned above, the timing for adding/subtracting the addition/subtraction data to/from the original audio data corresponds to the timing for adding/subtracting the addition/subtraction data to/from the preceding and the succeeding sample values of the top peak or the under peak if the pattern of the peak-to-peak compared output belongs to the 2 fs pattern to the 5 fs pattern. Also, the timing for adding/subtracting the addition/subtraction data to/from the original audio data corresponds to the timing for adding/subtracting the addition/subtraction data to/from the preceding and the succeeding sample values of the top peak or the under peak and the sample values two samples before and after from the top peak or the under peak if the pattern of the peak-to-peak compared output belongs to the 6 fs pattern to the 8 fs pattern.

Therefore, in this step S5, the addition/subtraction timing control circuit 40 decides the output timings of the addition/subtraction data from the bit shifter 39 according to the pattern of the peak-to-peak compared output indicated by the compared output from the selector 36, and then supplies the addition data to the adder 24 shown in FIG. 6 at respective timings via the output terminal 41.

Accordingly, if the pattern of the peak-to-peak compared output belongs to the 2 fs pattern to the 5 fs pattern, the addition/subtraction data are supplied to the adder 24 at the timings when the preceding and succeeding sample values of the top peak or the under peak are supplied to the adder 24, as shown by a dotted-line arrow in FIG. 9A.

Also, if the pattern of the peak-to-peak compared output belongs to the 6 fs pattern to the 8 fs pattern, the addition/subtraction data are supplied to the adder 24 at the timings when the preceding and succeeding sample values of the top peak or the under peak and the sample values two samples before and after from the top peak or the under peak are supplied to the adder 24, as shown by a dotted-line arrow in FIG. 9B.

Then, after the addition/subtraction data are supplied to the adder 24, the DVD player system of the second embodiment goes to step S6. In this step S6, the adder 24 adds/subtracts the addition/subtraction data (harmonic) formed by the harmonic generator circuit 23 to/from the original 16-bit audio data supplied from the delay circuit 22. Particular examples of the waveform change before and after the adding/subtracting process are shown in FIGS. 12A to 12C and FIGS. 13A to 13C.

Figure 12A:
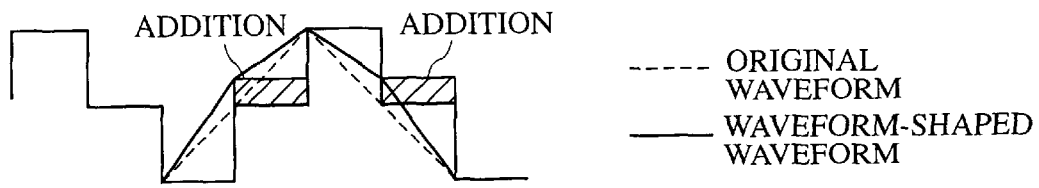
FIGS. 12A to 12C are views showing an example of a waveform of the audio data in which the addition amount is added respectively.
Figure 12B:
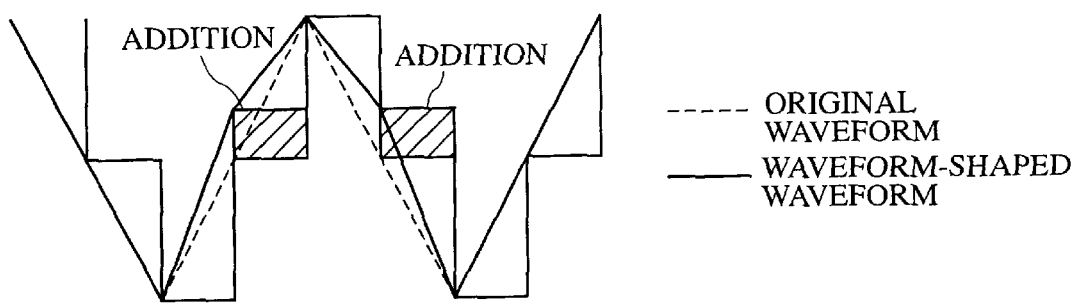
Figure 12C:
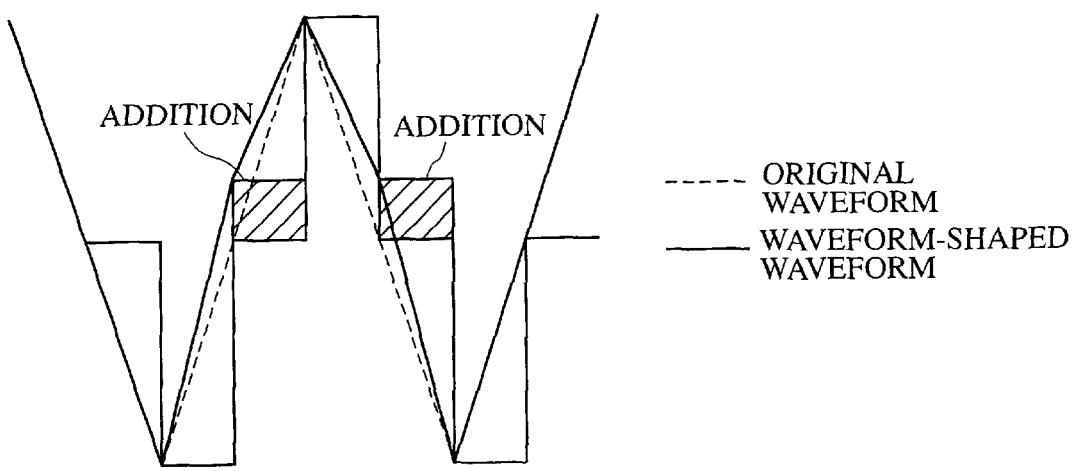

FIGS. 12A to 12C show the adding process if the pattern of the peak-to-peak compared output is the 2 fs pattern. As can be seen from FIGS. 12A to 12C, in case the pattern of the peak-to-peak compared output is the 2 fs pattern, the addition/subtraction data being calculated according to the difference level between the sample value of the top peak of the original audio data and the preceding and succeeding sample values of the top peak is added to the preceding and succeeding sample values of the top peak, as indicated by the oblique lines in FIGS. 12A to 12C. As a result, the waveforms of the original audio data indicated by a dotted line in FIGS. 12A to 12C can be waveform-shaped into the extended waveform whose frequency band is extended, as indicated by the solid line in FIGS. 12A to 12C.

Figure 13A:
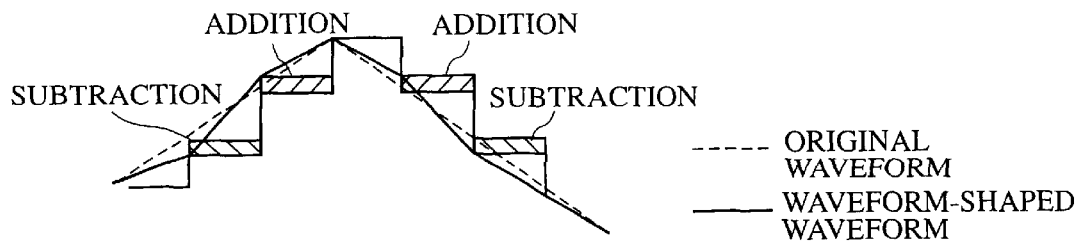
FIGS. 13A to 13C are views showing an example of a waveform of the audio data in which the addition/subtraction amount is added/subtracted respectively.
Figure 13B:
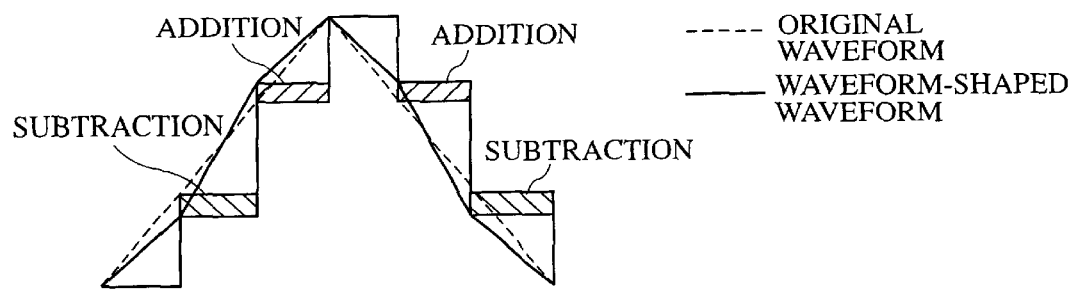
Figure 13C:
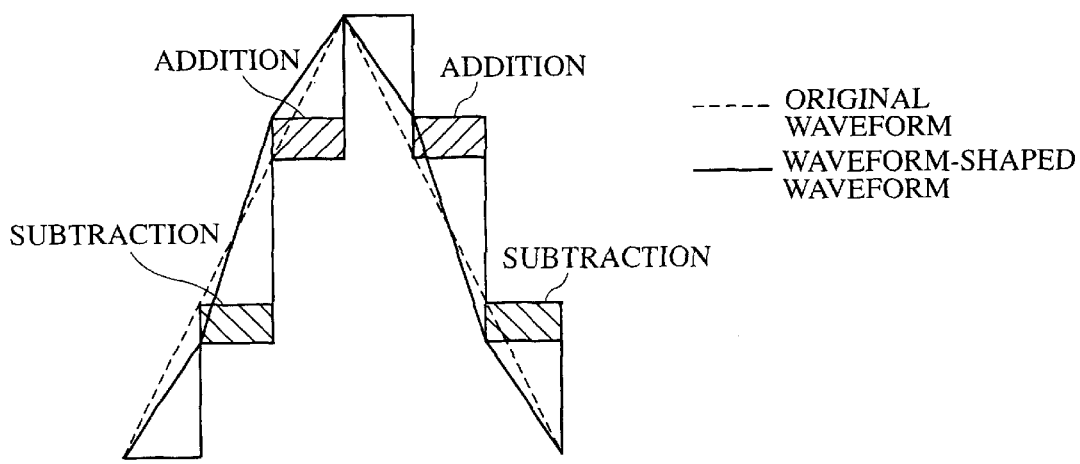

Similarly, FIGS. 13A to 13C show the adding/subtracting process if the pattern of the peak-to-peak compared output is the 3 fs pattern. As can be seen from FIGS. 13A to 13C, if the pattern of the peak-to-peak compared output is the 3 fs pattern, the addition/subtraction data being calculated according to the difference level between the sample value of the top peak of the original audio data and the preceding and succeeding sample values of the top peak is added to the preceding and succeeding sample values of the top peak, as indicated by the right-upward oblique lines in FIGS. 13A to 13C. Also, the addition/subtraction data being calculated according to the difference level between the preceding and succeeding sample values of the under peak of the original audio data and the sample values two samples before and after from the under peak is added to the sample values two samples before and after from the top peak, as indicated by the left-upward oblique lines in FIGS. 13A to 13C. As a result, the waveforms of the original audio data indicated by a dotted line in FIGS. 13A to 13C can be waveform-shaped into the extended waveform whose frequency band is extended, as indicated by the solid line in FIGS. 13A to 13C.

Figure 14:
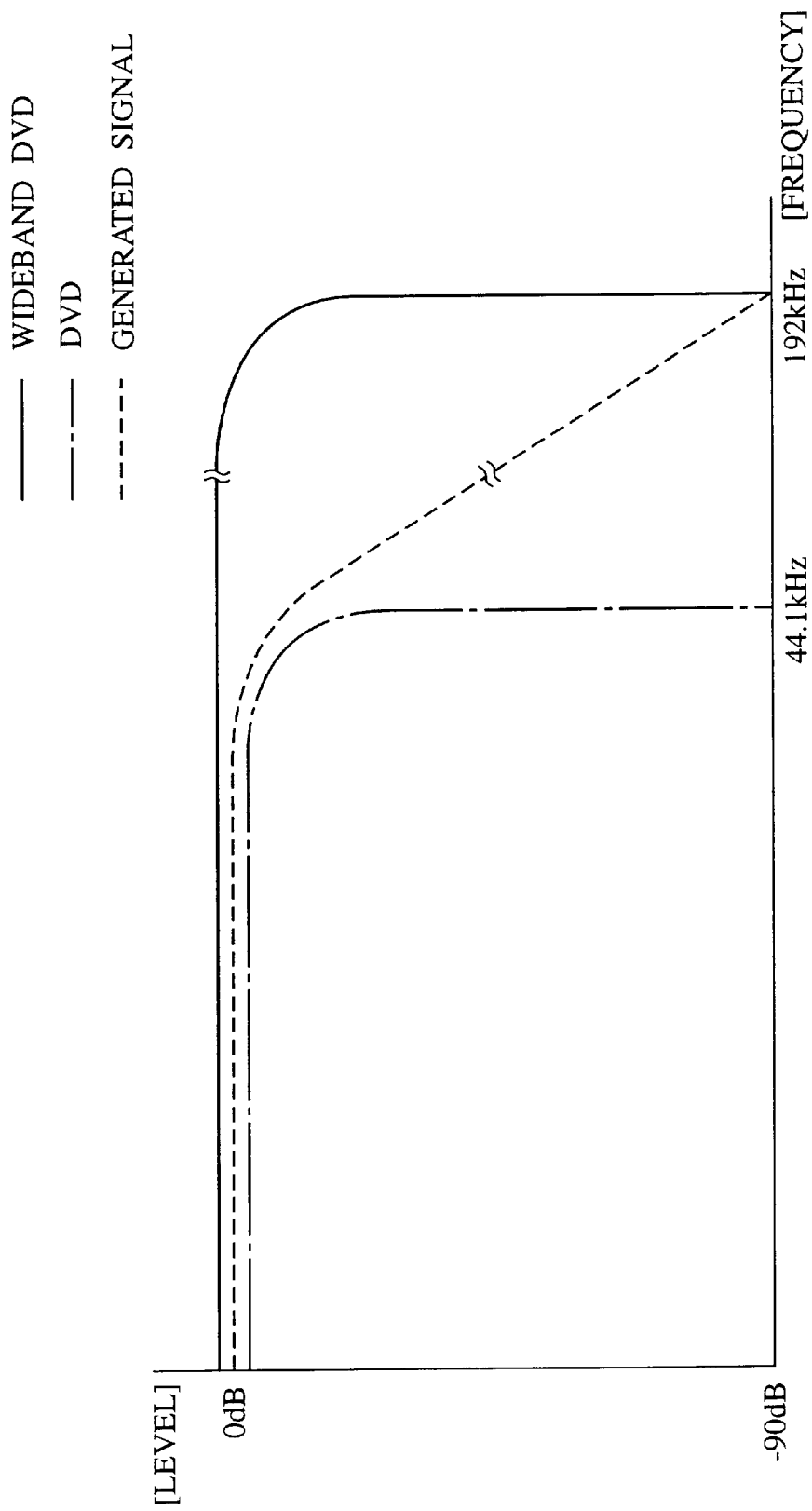
FIG. 14 is a view showing frequency bands of the audio information to which a bandwidth extending process is applied by the DVD player system of the second embodiment.

Here, the solid line in FIG. 14 indicates a frequency band of the DVD audio data as the 24-bit audio data that is subjected to the sampling process at 192 kHz. The dot-dash line in FIG. 14 indicates a frequency band of the CD audio data as the 16-bit audio data that is subjected to the sampling process at 44.1 kHz. The dotted line in FIG. 14 indicates a frequency band of the audio data which is the 16-bit audio data subjected to the sampling process at 192 kHz and to which a bandwidth extending process is applied in the DVD player system of the second embodiment.

As can be seen from the frequency characteristic indicated by the dotted line in FIG. 14, it can be understood that the frequency band of the CD audio data that has originally merely 44.1 kHz can be extended into 192 kHz that is identical to the frequency band of the DVD audio data, by applying the bandwidth extending process.

The DVD player system, when finishes the waveform-shaping process (bandwidth extending process) of such extension of the frequency band (finishes step S6), outputs the 16-bit audio data via the I/O port 25 and the output terminal 15. Thus, all routines of the flowchart shown in FIG. 8 are ended.

As explained with reference to FIG. 2, the DVD player system has the digital output terminal 9 for the digital output and the analog output terminal 8 for the analog output. The 16-bit audio data to which the wideband extending process is applied and which is output via the output terminal 15 is supplied to the digital output terminal 9 and the analog output terminal 8 respectively.

Accordingly, the audio data whose tone-quality is improved by the wideband extending process can be output via the digital output terminal 9 in digital fashion. This audio data is supplied to the digital equipment such as the digital video tape recorder equipment, the digital audio player equipment, etc., for example, and then recorded and played back in digital fashion. Therefore, the audio data that has higher tone quality by such a processing that the frequency band is extended rather than the original audio data can be recorded and played back without degradation of the tone quality in such digital equipment.

The D/A converter 7 converts the audio data that is subjected to the bandwidth extending process into the analog signal and then outputs this via the analog output terminal 8. Thus, the analog audio signal whose tone quality is improved by extending the bandwidth can be output. This analog audio signal is supplied to other recording/playing equipment, the speaker system, etc., for example. Then, if such analog audio signal is supplied to the speaker system, the rich sound output which is able to improve smoothness, lingering tone, and ambience, all being essential in the music, by extending the bandwidth can be obtained.

Advantages of the Second Embodiment

As evident from the above explanation, the DVD player system of the second embodiment can reproduce the narrow bandwidth audio data as the wide bandwidth audio data by oversampling the narrow bandwidth audio data by the frequency converter 13 and then extending the bandwidth by the bandwidth extender 14 to thus improve the tone quality, and in addition achieve the same advantages as those in the above first embodiment.

Also, the frequency converter 13 is constructed to "uniformly" oversample the audio data, which is subjected to the sampling process at the sampling frequency that is below the quadruple frequency (4 fs) or 192 kHz, at the sampling frequency of 4 fs or 192 kHz. Hence, regardless of the sampling frequency of the audio data recorded on the optical disc 1, the audio data that is sampled at the sampling frequency of 4 fs or 192 kHz can be uniformly supplied to the D/A converter 7.

Therefore, one type D/A converter, i.e., the D/A converter having the existing function corresponding to the DVD format can be employed as the D/A converter 7 as it is, and in addition the D/A converter 7 can be operated constantly. As a result, since it is not requested to provide a function for corresponding a plurality of formats such as the CD format the DVD format, etc. to the D/A converter, a configuration of the D/A converter 7 can be simplified and thus a cost of the DVD player system can be lowered.

In the explanation of the above embodiments, if the sampling frequency of the audio data recorded on the optical disc 1 is below 4 fs or 192 kHz, the audio data is oversampled uniformly at the sampling frequency of 4 fs or 192 kHz. In this case, if the sampling frequency is higher than the sampling frequency of the original audio data, the audio data may be oversampled at other sampling frequency. For example, the audio data may be oversampled at the sampling frequency of 48 kHz, 88.2 kHz, 96 kHz, or the like.

Third Embodiment

Next, a DVD player system according to a third embodiment of the present invention will be explained hereunder. In the DVD player system according to the above first embodiment, the tone quality can improved by applying the bit extending process to the audio data from the optical disc 1 by the bit extender 11. In the DVD player system according to the above second embodiment, the tone quality can improved by oversampling the audio data from the optical disc 1 by the frequency converter 13 and then extending the bandwidth by the bandwidth extender 14. In contrast, in the DVD player system according to the third embodiment, the tone quality can improved by applying the bit extending process, the oversampling process, and the bandwidth extending process to the audio data from the CD.

This third embodiment is merely different from the above embodiments in this respect. Therefore, only this difference will be explained hereunder and thus the redundant explanation of other portions will be omitted.

Configuration of the Third Embodiment

The DVD player system according to the third embodiment has the bit extender 11, the frequency converter 13, and the bandwidth extender 14 as the tone-quality improving portion 5 in FIG. 2, as shown in FIG. 15.

The audio data from the decoder 4 is supplied to such tone-quality improving portion 5 via an input terminal IN1. This input terminal IN1 is connected to the input end of the bit extender 11, the input end of the frequency converter 13 via a switch S5, and the input end of the bandwidth extender 14 via a switch S7 respectively, and connected to a first output terminal OUT1 via a switch S1.

The output end of the bit extender 11 is connected to a second output terminal OUT2, and connected to the first output terminal OUT1 via a switch S4, and connected to the input end of the frequency converter 13 via a switch S6.

The output end of the frequency converter 13 is connected to a third output terminal OUT3, and connected to the first output terminal OUT1 via a switch S3, and connected to the input end of the bandwidth extender 14 via a switch S8. The output end of the bandwidth extender 14 is connected to the first output terminal OUT1 via a switch S2.

Operation of the Third Embodiment

The tone-quality improving portion 5 has a "normal playback mode" for outputting audio information reproduced from the optical disc 1 as it is, a "bit-expansion playback mode" for playing back the audio information reproduced from the optical disc 1 only by applying the bit extending process, a "frequency-conversion playback mode" for playing back the audio information reproduced from the optical disc 1 only by applying the frequency converting process, and a "bandwidth-expansion playback mode" for playing back the audio information reproduced from the optical disc 1 only by applying the bandwidth extending process.

Also, the tone-quality improving portion 5 has a "bit-expansion/frequency-conversion playback mode" for playing back the audio information reproduced from the optical disc 1 by applying the bit extending process and the frequency converting process, a "frequency-conversion/bandwidth-expansion playback mode" for playing back the audio information reproduced from the optical disc 1 by applying the frequency converting process and the bandwidth extending process, and a "bit-expansion/frequency-conversion/bandwidth-expansion playback mode" for playing back the audio information reproduced from the optical disc 1 by applying the bit extending process, the frequency conversion process, and the bandwidth extending process.

Respective playback modes of seven types are manually selected by the user (manual selection) or automatically selected by the controller 9 based on the format information (auto selection).

Operation in Manual Selection

First, in the manual selection, when the "normal playback mode" is selected by the user, the controller 6 controls to close the switch S1 only, and supplies the audio data, that is supplied from the decoder 4 via the input terminal IN1, to the digital output terminal 9 and the D/A converter 7 via the switch S1 and the first output terminal OUT1. Accordingly, the 16-bit audio data reproduced from the optical disc 1, for example, is output via the digital output terminal 9 in digital fashion as it is, or is converted into the analog audio signal by the D/A converter 7 and then output. As a result, the sound output recorded on the optical disc 1, etc. can be obtained as it is.

Then, in the manual selection, when the "bit-expansion playback mode" is selected by the user, the controller 6 controls to open all the switches S1 to S8. Accordingly, as explained in the above first embodiment, the 16-bit audio data supplied via the input terminal IN1 is bit-extended into 24-bit audio data, for example, by the bit extender 11. Then, the 24-bit audio data is supplied to the digital output terminal 9 and the D/A converter 7 via the second output terminal OUT2. Accordingly, the 16-bit audio data reproduced from the optical disc 1, for example, is converted into the 24-bit audio data to improve the tone-quality, and then output via the digital output terminal 9 in digital fashion, or is converted into the analog audio signal by the D/A converter 7 and then output. As a result, as explained with reference to FIG. 4B, the sound output that has the smooth reproduced waveform by increasing the bit number, etc. can be obtained.

Then, in the manual selection, when the "frequency-conversion playback mode" is selected by the user, the controller 6 controls to close the switch S5 only. Accordingly, the audio data supplied via the input terminal IN1 and having the low sampling frequency of 44.1 kHz, for example, is oversampled by the frequency converter 13 at the sampling frequency that is equal to the quadruple sampling frequency (176.4 kHz) or 192 kHz.

Then, the audio data is supplied to the digital output terminal 9 and the D/A converter 7 via the third output terminal OUT3. As a result, the digital audio output or the analog audio output that has the smooth reproduced waveform due to the improvement of the resolution can be obtained.

Then, in the manual selection, when the "bandwidth-expansion playback mode" is selected by the user, the controller 6 controls to close the switch S2 and the switch S7. Accordingly, as explained in the above second embodiment, the audio data supplied via the input terminal IN1 and having the narrow frequency band of 44.1 kHz, for example, is bandwidth-extended into the wide frequency band of 176.4 kHz or 192 kHz by the bandwidth extender 14.

Then, the audio data is supplied to the digital output terminal 9 and the D/A converter 7 via the first output terminal OUT1. Accordingly, the rich sound output whose bandwidth is extended into 176.4 kHz or 192 kHz by the bandwidth extending process can be obtained.

Then, in the manual selection, when the "bit-expansion/frequency-conversion playback mode" is selected by the user, the controller 6 controls to close the switch S6 and the switch S3. Accordingly, the audio data supplied via the input terminal IN1 is bit-extended into 24-bit, for example, by the bit extender 11 and then is oversampled by the frequency converter 13 at the sampling frequency of 176.4 kHz or 192 kHz. Then, the audio data is supplied to the digital output terminal 9 and the D/A converter 7 via the first output terminal OUT1.

As a result, the sound output whose tone quality is improved by the bit extending process and the oversampling process can be obtained.

Then, in the manual selection, when the "frequency-conversion/bandwidth-expansion playback mode" is selected by the user, the controller 6 controls to close the switch S2, the switch S5 and the switch S8. Accordingly, the audio data supplied via the input terminal IN1 is oversampling-processed by the frequency converter 13 and also bandwidth-extended by the bandwidth extender 14. Then, the audio data is supplied to the digital output terminal 9 and the D/A converter 7 via the first output terminal OUT1.

As a result, the sound information whose tone quality is improved by the oversampling process and the bandwidth extending process can be obtained.

Operation in Automatic Selection

Next, in the DVD player system, when the auto selection is selected by the user, the controller 6 automatically carried out the switching control of the switches S1 to S8 based on the format information supplied from the decoder 4.

First, if it is detected that the bit number of the audio data recorded on the optical disc 1 is less than 24 bits, for example, or if it is detected that the sampling frequency of the audio data recorded on the optical disc 1 is less than 4 fs (1 fs is 44.1 kHz or 48 kHz) or 192 kHz, the controller 6 controls to close the switch S2, the switch S6, and the switch S8 respectively.

Accordingly, the audio data supplied via the input terminal IN1 is bit-extended into 24-bit by the bit extender 11, then is oversampled by the frequency converter 13 at the sampling frequency of 192 kHz, etc., and then bandwidth-extended by the bandwidth extender 14. Then, the audio data is supplied to the digital output terminal 9 and the D/A converter 7 via the first output terminal OUT1. As a result, the sound output whose tone quality is improved by the bit extending process, the oversampling process, and the bandwidth extending process can be obtained.

Advantages of the Third Embodiment

As apparent from the above explanation, the DVD player system according to the third embodiment can achieve the same advantages as those in the above embodiments. In addition, the DVD player system according to the third embodiment can obtain the audio outputs of seven tone qualities from the audio information per se reproduced from the optical disc 1 to the audio information whose tone quality is improved by the bit extending process, the oversampling process, and the bandwidth extending process, by switching manually the switches S1 to S8. Especially, the audio output whose tone quality is improved by the bit extending process, the oversampling process, and the bandwidth extending process to have the high tone quality substantially equal to the DVD can be obtained by selecting the "bit-expansion/frequency-conversion/bandwidth-expansion playback mode".

Also, by selecting the auto select, when the bit number of the audio information recorded on the optical disc 1 is less than 24 bits, for example, or when the sampling frequency of the audio information recorded on the optical disc 1 is less than 4 fs or 192 kHz, the audio output whose tone quality is improved by the bit extending process, the oversampling process, and the bandwidth extending process to have the high tone quality substantially equal to the DVD can be obtained automatically.

Finally, the present invention is not limited to the above embodiments explained as examples. For example, the audio information reproduced from the optical recording medium such as CD, etc. is processed in the explanation of the above embodiments. In addition to this, the present invention may be applied to any equipment such as the mobile telephone, etc., for example, which can deal with the audio information.

Also, both terminals of the analog output terminal 8 and the digital output terminal 9 are provided in the above embodiments. In this case, merely the analog output terminal 8 or the digital output terminal 9 may be provided.

Furthermore, besides the above, it is of course that various modifications may be applied in accordance with the design, etc. without the departing from the technical spirit or range according to the present invention.

What is claimed is:

1. An audio information reproduction system capable of reproducing audio information from a plurality of optical discs, audio information pieces on the respective optical discs being obtained by sampling with respective sampling frequencies different from each other and being recorded at respective bit-number precisions different from each others, the audio information reproduction system comprising:

an optical pickup which reproduces format information and audio information recorded on an optical disk set into the audio information reproduction system;

a controller which retrieves bit-number information and sampling frequency information from the format information;

bit-number extending means for receiving the bit-number information from the controller and carrying out bit-extending processing on the audio information reproduced from the optical disc at a predetermined bit-number precision irrespective of the received bit-number information;

resampling means for receiving the sampling frequency information from the controller and resampling the audio information at a predetermined sampling frequency irrespective of the received sampling frequency information;

bandwidth extending means for receiving the sampling frequency information from the controller and carrying out frequency-band-extending processing on the audio information so as to extend an upper frequency of the frequency band of the reproduced audio information up to a predetermined upper frequency irrespective of the received sampling frequency information; and a digital/analog converter which converts the audio information after processing by the bit-number extending means, the resampling means and the bandwidth extending means into analog audio information.

2. An audio information reproduction system according to claim 1 wherein the bit-number extending means carries out the bit-extending processing on the audio information at the same bit-number precision as the highest bit-number precision among the respective bit-number precisions for the optical discs;

the resampling means resamples the audio information at the same sampling frequency as the highest sampling frequency among the respective sampling frequencies for the optical discs; and the bandwidth extending means carries out the frequency-band-extending processing on the audio information so as to extend the upper frequency of the frequency band of the reproduced audio information up to the highest upper frequency among the upper frequencies of frequency bands of the respective audio information pieces.

3. An audio information reproduction system capable of reproducing audio information from a plurality of optical discs, audio information pieces on the respective optical discs being obtained by sampling with respective sampling frequencies different from each other and being recorded at respective bit-number precisions different from each others, the audio information reproduction system comprising:

an optical pickup which reproduces format information and audio information recorded on an optical disk set into the audio information reproduction system;

a controller which retrieves bit-number information and sampling frequency information from the format information;

bit-number extending means for receiving the bit-number information from the controller and carrying out bit-extending processing on the audio information reproduced from the optical disc at a desired bit-number precision;

resampling means for receiving the sampling frequency information from the controller and resampling the audio information at a desired sampling frequency;

bandwidth extending means for receiving the sampling frequency information from the controller and carrying out frequency band extending processing on the audio information reproduced from the optical disc so as to extend an upper frequency of the frequency band of the reproduced audio information up to a desired upper frequency; and switches that are manipulated to enable at least one of the bit-number extending means, the resampling means and the bandwidth extending means to be effective.

* * * * *